US007826077B2

(12) United States Patent
Tamai et al.

(10) Patent No.: US 7,826,077 B2
(45) Date of Patent: Nov. 2, 2010

(54) APPARATUS, SYSTEM AND METHOD FOR EXECUTING IMAGE PROCESSING BASED ON JOB DATA STORED IN A PORTABLE STORAGE MEDIUM

(75) Inventors: Yoshiyuki Tamai, Itami (JP); Hisashi Uchida, Kyoto (JP); Hiroyuki Kawabata, Kawanishi (JP); Masami Yamada, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1364 days.

(21) Appl. No.: 11/230,327

(22) Filed: Sep. 20, 2005

(65) Prior Publication Data
US 2006/0268310 A1 Nov. 30, 2006

(30) Foreign Application Priority Data
May 10, 2005 (JP) .............................. 2005-137285

(51) Int. Cl.
G06K 15/00 (2006.01)
H04N 1/60 (2006.01)
(52) U.S. Cl. ..................................... 358/1.14; 358/1.16
(58) Field of Classification Search .................. 358/1.1, 358/1.12, 1.13, 1.15, 1.16, 474, 400, 464
See application file for complete search history.

(56) References Cited
U.S. PATENT DOCUMENTS
6,058,249 A    5/2000   Matsuda et al.

6,301,611 B1   10/2001   Matsumoto et al.
(Continued)

FOREIGN PATENT DOCUMENTS
JP           5-301429 A    11/1993
(Continued)

OTHER PUBLICATIONS
Japanese Office Action dated Jul. 10, 2007, directed to counterpart JP Application No. 2005-137285 (7 pages).
(Continued)

Primary Examiner—Gabriel I Garcia
(74) Attorney, Agent, or Firm—Morrison & Foerster LLP

(57) ABSTRACT

The system according to the present invention includes: a portable storage medium which can store data and job data regarding a job to be executed by the image processing apparatus; an information processing apparatus which can record and read the job data in the portable storage medium to be executed by the image processing apparatus; and at least one image processing apparatus which can read and update the job data stored in the portable storage medium. The image processing apparatus reads the job data stored in the portable storage medium and executes image processing based on the job data. In addition, when the job data is interrupted during its execution, the image processing apparatus can add data which indicates that the job is interrupted in the job data or record the data which indicates that the job is interrupted to be related with the job data. The image processing apparatus reads the job data which includes the data indicating that the job is interrupted and resumes the job from the interrupted state. The data which indicates that the job is interrupted may be recorded to be related with the job data separately from the job data.

10 Claims, 8 Drawing Sheets

U.S. PATENT DOCUMENTS

| | | | |
|---|---|---|---|
| 7,515,290 B2 * | 4/2009 | Negishi et al. | 358/1.15 |
| 2002/0012129 A1 | 1/2002 | Amemiya | |
| 2002/0089692 A1 * | 7/2002 | Ferlitsch | 358/1.15 |
| 2003/0090695 A1 * | 5/2003 | Murata | 358/1.13 |
| 2007/0061505 A1 * | 3/2007 | Deng et al. | 711/103 |
| 2007/0083491 A1 * | 4/2007 | Walmsley et al. | 707/3 |

FOREIGN PATENT DOCUMENTS

| | | |
|---|---|---|
| JP | 8016339 | 1/1996 |
| JP | 8-241178 A | 9/1996 |
| JP | 9274605 | 10/1997 |
| JP | 10-149265 A | 6/1998 |
| JP | 10164284 | 6/1998 |
| JP | 2001-047700 A | 2/2001 |
| JP | 2001-053913 A | 2/2001 |
| JP | 2001-166898 A | 6/2001 |
| JP | 2001-1166898 A | 6/2001 |
| JP | 2001320529 | 11/2001 |
| JP | 2002-044311 A | 2/2002 |
| JP | 2002-259074 A | 9/2002 |
| JP | 2002-326404 A | 11/2002 |
| JP | 2003-127508 A | 5/2003 |
| JP | 2004-015818 A | 1/2004 |
| JP | 2004-056200 A | 2/2004 |
| JP | 2004-072762 A | 3/2004 |
| JP | 2004175043 | 6/2004 |
| JP | 2004-318432 A | 11/2004 |
| JP | 2005-059983 A | 3/2005 |
| WO | WO 01/97004 A1 | 12/2001 |

OTHER PUBLICATIONS

Notification of Reasons for Refusal dated Oct. 27, 2009, directed to application No. 2007-234330, 12 pages.

* cited by examiner

APPARATUS, SYSTEM AND METHOD FOR EXECUTING IMAGE PROCESSING BASED ON JOB DATA STORED IN A PORTABLE STORAGE MEDIUM

This application is based on an application No. 2005-137285 filed in Japan, the contents of which are hereby incorporated by reference.

BACKGROUND OF THE INVENTION

1. Field of the Invention

The present invention relates to an image processing apparatus, an image processing system and an image processing method, and in particular, to an apparatus, a system and a method for executing image processing based on job data stored in a portable storage medium.

2. Description of the Related Art

Recently, a multifunctional peripheral (hereinafter referred to as MFP) is widely used as an image processing apparatus at home or in an office. The MFP performs a plurality of functions provided for a conventional copying machine, a printer, a scanner, a facsimile machine, etc.

The MFP is connected to an electronic processor, that is, an electronic computer, typically a personal computer (hereinafter referred to as PC), a scanner and the like via a network. Among these functions, the print function is implemented by receiving printing control information and image data (including character data) from the electronic computer, the scanner or the like by executing printing. Data can be transmitted via a data communication medium which physically constitutes the network including a public communication line and a dedicated communication line. In addition, data may be transmitted by using a portable storage medium (a flexible disk, a universal serial bus (USB) memory device, a card type memory device or the like).

Regarding the scan function of the MFP, image data is created by an imaging unit and an input image processor, and its file format is converted to a predetermined file format such as bitmap, JPEG, GIF, TIFF, PDF or the like. A file of the image data is stored in the MFP and is also transmitted via the above mentioned data communication medium. An operator can input information for controlling the scan function through an operating unit of the MFP. Alternatively, by using the electronic computer connected to the MFP via the above mentioned communication medium, an operator can also send a scan instruction to the MFP.

Regarding the facsimile function, the image data created by the imaging unit and the input image processor of the MFP, or the data transmitted from the electronic computer or the like via the data communication medium can be transmitted to an apparatus having a facsimile function via a public communication line including a telephone infrastructure. The operator can input information for controlling the facsimile function through the operation unit of the MFP. Alternatively, by using the electronic computer connected to the MFP via the data communication medium, the operator can also send a facsimile instruction to the MFP.

As just described, the MFP is a very useful apparatus because of its versatile functionality. Since its data processing is digitalized, it has high affinity with the electronic computer and the like. Therefore, the MFPs have been increasingly dominating in place of the conventional copying machines, scanners, printers, facsimile machines and the like.

However, the MFP has also disadvantages. Since an MFP has an ability to perform many functions by itself, sometimes jobs from operators are congested in the MFP. Although, in general, the jobs are sequentially executed in order of receipt or according to a predetermined priority, if a malfunction occurs during the execution of one of these jobs, the operation of the MFP is stopped with some remaining jobs unexecuted. If any measures such as dissolution of the error or cancellation of the job having caused the error are not adopted, the operation of the MFP is not restored. So processes for the remaining jobs are delayed. In addition, even if the MFP is restored, the operator has to instruct the same or another MFP to execute the cancelled job all over again since the cancelled job data is lost. Here, the job data includes data for selecting one function of the MFP, control information such as data of a parameter group such as image size, colored or monochromatic, print paper size and the like which the operator can select while he or she instructs the execution of the function, and image data to be processed.

Japanese Patent Laid-open Publication No. 2001-166898 discloses means for avoiding a deadlock of an image processing apparatus such as an MFP due to one job. According to this Laid-open Japanese Patent Publication No. 2001-166898, image data which cannot be printed by the apparatus is stored in an external memory device, accidental occupation of the MFP or the like by one operator (operation halt of the MFP or the like because of an error and the like) can be avoided.

In addition, Japanese Patent Laid-open Publication No. 2001-047700 discloses means for minimizing evaporation (loss) of job data when an error occurs in an MFP or the like by storing in a portable storage medium the data of unprocessed jobs, and a job under processing which the MFP or the like have received and temporally stored.

Japanese Patent Laid-open Publications Nos. 2003-127508, 2004-056200, 2004-072762, and 2004-015818 and International Publication WO01/097004 disclose means for performing image processing by an operator through previously storing the job data to be executed by an MFP or the like in a portable storage medium and through transmitting the job data stored in the portable storage medium to the MFP or the like. Since the job data is stored in the portable storage medium, the evaporation (loss) or deletion of unprocessed job data when an error occurs or the like can be avoided in general.

The Japanese Patent Laid-open Publication No. 2003-127508 especially discloses means for executing a print job stored in a portable storage medium by an MFP or the like. Here, off-line printing is implemented by providing means for storing the print job in the portable storage medium and for transmitting the job data to the MFP or the like.

In addition, the Japanese Patent Laid-open Publication No. 2004-056200 discloses means for printing image data stored in a portable storage medium by an MFP or the like directly. By sorting out the image data to be printed from the image data stored in the portable storage medium, a wasteful output is avoided.

Furthermore, the Japanese Patent Laid-open Publication No. 2004-072762 discloses means for executing a scan by an MFP or the like according to a scan job stored previously in a portable storage medium and for storing the image data created by this scan operation in the portable storage medium. Similar to the Japanese Patent Laid-open Publication No. 2003-127508, off-line printing is implemented by providing means for storing the print job in the portable storage medium and for transmitting the job data to the MFP or the like.

Furthermore, the Japanese Patent Laid-open Publication No. 2004-015818 discloses means for generating control data for outputting image data by executing a print job stored in a portable storage medium and for executing the job by a digital plain paper copying machine. Similar to the Japanese Patent Laid-open Publications Nos. 2003-127508 and 2004-072762, off-line print is implemented by providing means for storing the print job in the portable storage medium and for transmitting the job data to the MFP or the like.

In addition, the International Publication WO01/097004 discloses means for executing a print job by the MFP or the like, its print job data being stored in a portable storage medium. When the printing is performed based on the print job data, the job data instructing the MFP or the like to perform color printing, in the case where the MFP or the like cannot output a color print the means disclosed therein suitably converts the job data for a monochromatic printing and executes the converted job data.

Although various kinds of proposals regarding storing jobs in a portable storage medium and executing the jobs have been made, they are not user-friendly. For example, the Japanese Patent Laid-open Publication No. 2001-047700 proposes to store a job in a portable storage medium when the job is interrupted due to an error, so the job interrupted by the error is stored in every each error. When multiple errors occur in the same job, the job is stored more than once, so that storage capacity of the portable storage medium will be readily running out. In addition, although it is described to display a list to select a job or jobs to be executed when the job or jobs are stored in the portable storage medium, it is difficult for a user to finish the job or jobs without changing its setting or their settings in some cases.

SUMMARY OF THE INVENTION

It is an object of the present invention to make it easy for a user to execute a job or jobs stored in a portable storage medium.

In an aspect of the present invention, an image processing apparatus includes: an information reader which reads job data from a portable storage medium in which the job data is stored; a job executor which executes a job based on the job data read by said information reader; and an information recorder which records in the portable storage medium interruption information that the job is interrupted, the interruption information being related with the job data stored in the portable storage medium, when the job is interrupted.

In another aspect of the present invention, an information processing apparatus includes: a data reader which reads job data related with interruption information from a portable storage medium in which the job data and the interruption information are stored; and a data transmitter which transmits the job data related with the interruption information to a image processing apparatus connected to said information processing apparatus.

In a further aspect of the present invention, an image processing system includes an image processing apparatus and an information processing apparatus, wherein said image processing apparatus including: an information reader which reads job data from a portable storage medium in which the job data is stored; a job executor which executes a job based on the job data read by said information reader; and an information recorder which records in the portable storage medium interruption information that the job is interrupted, the interruption information being related with the job data stored in the portable storage medium, when the job is interrupted, and said information processing apparatus connected to said image processing apparatus including: a data reader which reads job data related with interruption information from a portable storage medium in which the job data and the interruption information are stored; and a data transmitter which transmits the job data related with the interruption information to a image processing apparatus connected to said information processing apparatus.

In a still further aspect of the present invention, an image processing apparatus includes: an information reader which reads job data and status information from a portable storage medium in which job data and status information of the job data to be related with the job data are stored; a job execution order determiner which determines an execution order of jobs based on the status information read by said information reader; and a job executor which executes the job based on the job data read by said information reader, in accordance with the execution order of the jobs determined by said job execution order determiner.

In an even further aspect of the present invention, an image processing apparatus includes: an information reader which reads job data and interrupted time information recorded to be related to the job data and indicating a time when a job based on the job data is interrupted, from a portable storage medium in which the plurality of job data and the interrupted time information are stored; a job execution order determiner which determines an execution order of the plurality of jobs of the plurality of job data based on the interrupted time information read by said information reader; and a job executor which executes a job based on one job data of the plurality of job data read by said information reader, in accordance with the execution order of the jobs determined by said job execution order determiner.

In a different aspect of the present invention, an image processing apparatus includes: an information reader which reads job data and time information recorded to be related with the job data and indicating a time when the job data is stored or a time when a job based on the job data is interrupted, from a portable storage medium in which the job data and the time information are stored; a determiner which determines whether or not a time interval between a time indicated by the time information read by said information reader and present time is longer than or equal to a predetermined time interval; and a job executor which executes the job based on the job data related with the time information when it is determined that the time interval is shorter than the predetermined time interval by said determiner.

In a still different aspect of the present invention, A method for image processing includes: reading job data stored in a portable storage medium by an image processing apparatus; executing a job based on the job data by the image processing apparatus; and recording interruption information that the job is interrupted, the interruption information being related with the job data stored, in the portable storage medium when the job is interrupted during execution.

It is an advantage of the present invention that the image processing apparatus can read the job data stored in the portable storage medium to execute the job.

It is another advantage of the present invention that the interrupted job, which is interrupted by one image processing apparatus, can be resumed and finished by another image processing apparatus.

BRIEF DESCRIPTION OF THE DRAWINGS

The above and further objects and novel features of the invention will more fully appear from the following detailed description when the same is read in connection with the accompanying drawings, and in which.

It is to be expressly understood, however, that the drawings are for the purpose of illustration only and are not intended as definitions of the limits of the invention.

DETAILED DESCRIPTION OF THE PREFERRED EMBODIMENTS

Preferred embodiments of the present invention are described in more detail below referring to the accompanying drawings.

[System Configuration]

Figure 1:
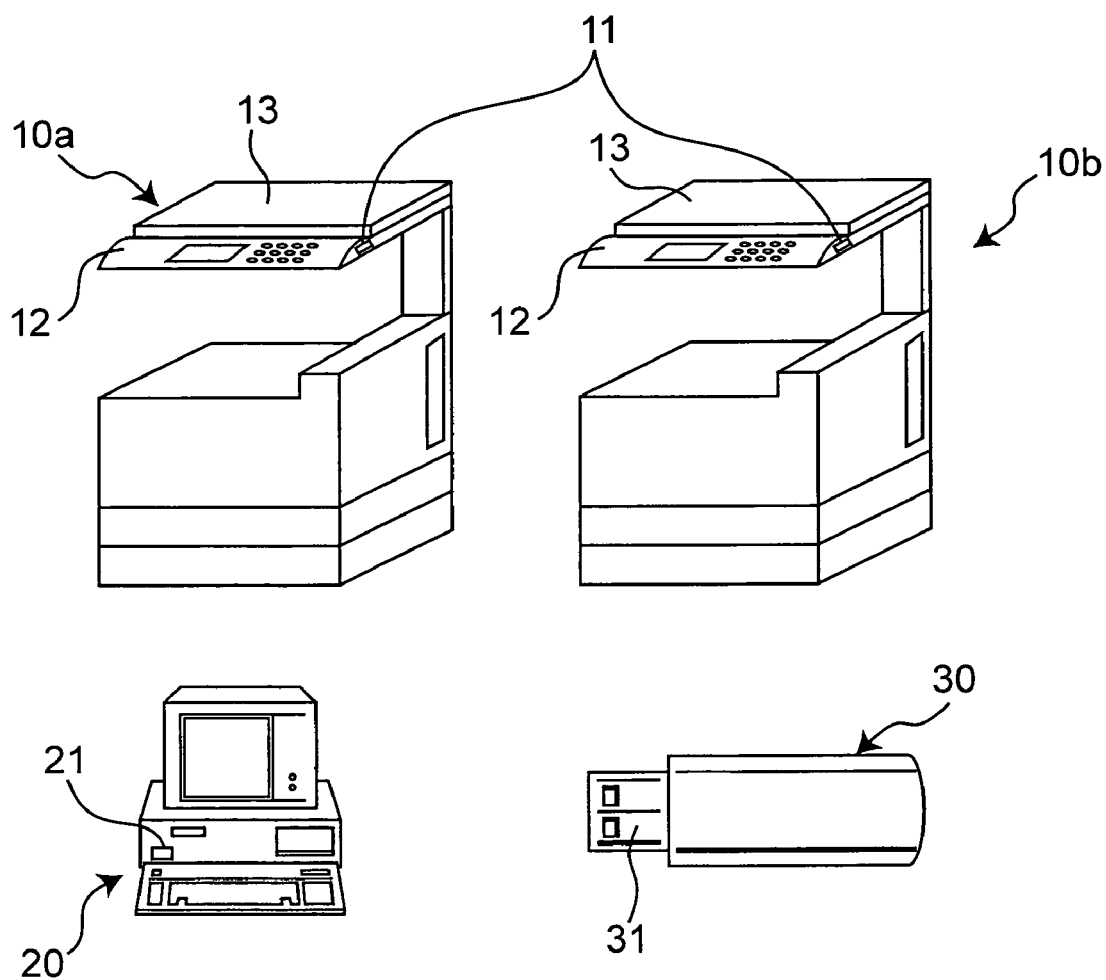
FIG. 1 is a schematic diagram of a system according to an embodiment of the present invention.

FIG. 1 is a schematic diagram of a system according to an embodiment of the present invention. The system includes multifunction peripherals (MFPs) 10a and 10b serving as image processing apparatuses, a personal computer (PC) 20 which is a kind of electronic computer, serving as an information processing apparatus, and a USB memory 30 which is a portable storage medium. The MFPs 10a and 10b may have the equivalent functions. Alternatively, one MFP 10a may have a function not provided in the other MFP 10b. Furthermore, the system may have only one MFP 10a.

Each of the MFPs 10a and 10b has at least one of a print function, a scan function, a copy function and a facsimile function. At least one in the above functions of the MFP 10a or 10b can be implemented by reading job data of a predetermined data format stored in the USB memory connected through a USB port 11 which is an interface for the portable storage medium. In addition, each of the MFPs 10a and 10b has an operation panel 12 which is an interface with an operator, and the operator can instruct the MFP 10a or 10b to execute a function by operating it. In addition, since each of the MFPs 10a and 10b has an image reading unit 13, it can read an original put on the image reading unit 13 to create electronic data. The created electronic data can be output as a printed material according to an instruction of the operator.

The PC 20 may be an electronic computer having a display device and a keyboard which are interfaces with the operator and having a common functionality. And, in order to record a job to be executed by the MFP 10a or 10b in the USB memory 30 as job data, the PC 20 needs to have a USB port 21 which can be connected to the USB memory 30. In addition, the PC 20 and the MFP 10a or 10b are connected by a communication line and may form a network although it is not shown in FIG. 1. In this case, the job data can be transmitted from the PC 20 to the MFP 10a and/or 10b through the communication line to carry out the job.

The USB memory 30 is a storage medium having a USB connection unit 31. The USB memory 30 may have a predetermined storage capacity. And contents of the stored data in the USB memory 30 can be read out, and data can be stored by the MFPs 10a and 10b and the PC 20.

Figure 2:
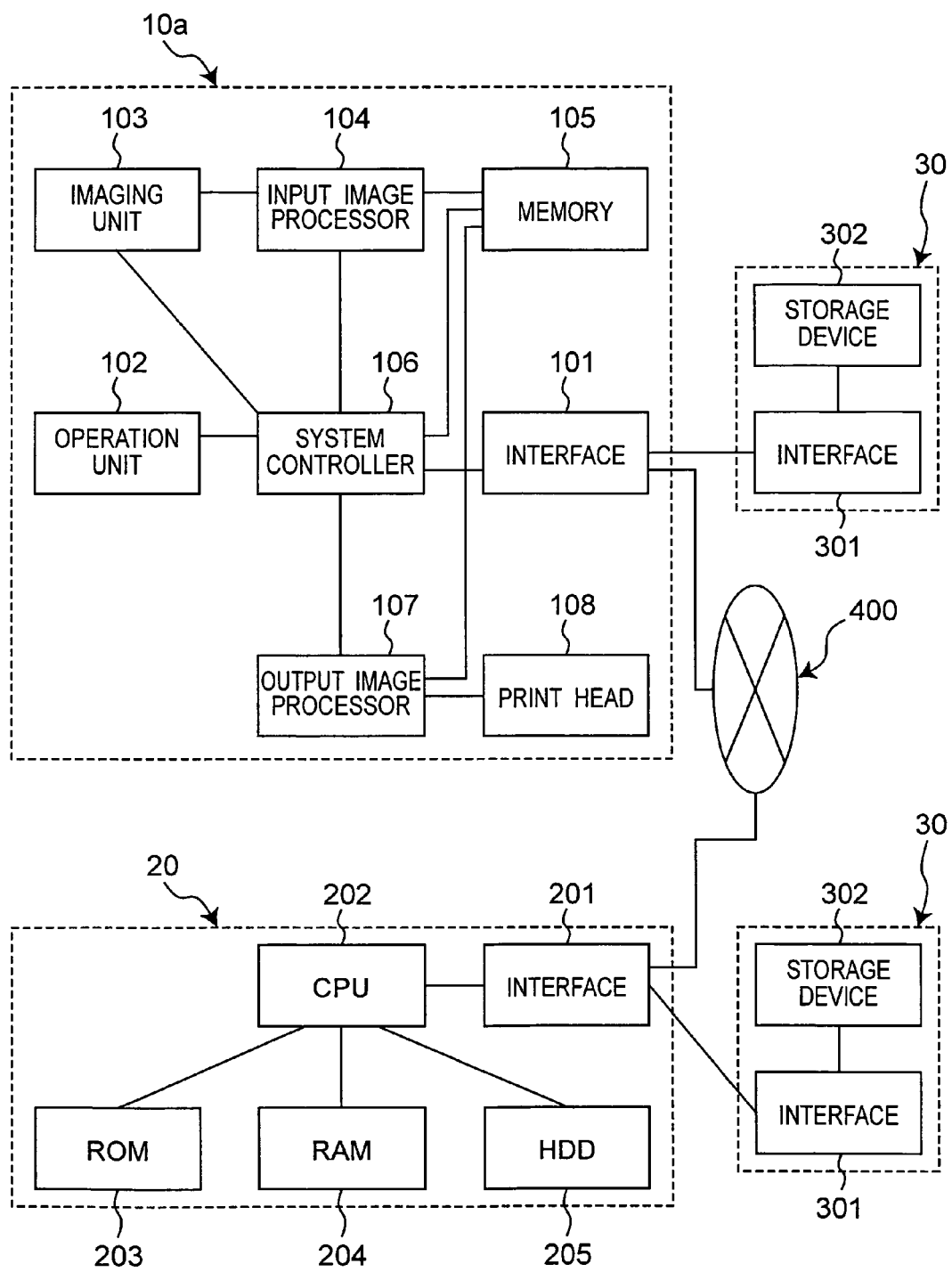
FIG. 2 is a block diagram of the system according to the embodiment of the present invention.

FIG. 2 is a block diagram of the configuration of the system.

First, the MFP 10a includes an imaging unit 103 to read an original set on the image reading unit 13, and an input image processor 104 to process the input image data. An operation unit 102 is a block corresponding to the operation panel 12 shown in FIG. 1. In addition, the MFP 10a has an output image processor 107 and a print head 108 to output the data as a printed material. A system controller 106 comprises a central processing unit (CPU) and storage devices such as a read-only memory (ROM), a random access memory (RAM), and a hard disk (disc) drive (HDD), and controls the operation unit 102, the imaging unit 103, the input image processor 104, a memory device 105, and the output image processor 107. Various kinds of control programs and data are stored in the storage devices. The input image processor 104, output image processor 107, and system controller 106 can access the memory 105 in which the contents of the job, the image data and the like are stored. In addition, the MFP 10a has an interface (I/F) 101 through which the MFP 10a can receive information from an external apparatus or a device such as the PC 20, the USB memory 30, or the like and can transmit information to the external apparatus or device. The I/F 101 has the USB port and the network connection unit, for example. The I/F 101 is connected to the system controller 106, and the input and output of data through the I/F 101 is under control of the system controller 106. The system controller 106 can implement an information reader which reads the data from the portable storage medium, and an information recorder which records (stores) the data in the portable storage medium. Also, the system controller 106 implements a job executor which executes the job based on the job data, a receiver which receives the data from other than the portable storage medium (for example, from the PC 20 via the network or from the image reading unit 13), a job execution order determiner which determines an execution order of the jobs, and a determiner which determines an execution of a job based on the received data. The system controller 106 implements these functions by using the various kinds of control programs and the CPU (not shown) which executes these programs, in cooperation with the other components of the MFP 10a. And the system controller 106 can control a display which provides the information to the operator and a selector through which the operator inputs instructions.

The description of the MFP 10b will be omitted since the MFP 10b has the same configuration as that of the MFP 10a.

The PC 20 has a central processing unit (CPU) 202. A read-only memory (ROM) 203 and a random access memory (RAM) 204 as main storage devices, and a hard disk drive 205 as an auxiliary storage device are connected to the CPU 202. In addition, the PC 20 has an interface (I/F) 201 connected to the CPU 202. The I/F 201 may be a network connection unit and/or a USB port. The PC 20 has a display device and a keyboard which are general interfaces to the operator although they are not shown in the drawing. Various kinds of programs and data are stored in the storage devices 203, 204, and 205. The PC 20 can implement a data reader which reads the data from the portable storage medium and a data transmitter which transmits the data to the MFP or the like that is connected by the network or the like. The PC 20 implements these in cooperation with the other components of the PC 20, the various kinds of programs and the CPU 202 which executes these programs.

The USB memory 30 is a nonvolatile storage device 302, and the storage device 302 is connected to an interface (I/F) 301 which is an USB connection unit. Data can be read or written by an external device connected through the USB connection unit.

In this drawing, the MFP 10a and the PC 20 are connected to each other via a network 400. The data can be transmitted or received between the MFP 10a and the PC 20 through the network 400.

[Image Processing Procedures]

Next, an image processing method in the above-mentioned system according to the present invention will be described with reference to the accompanying drawings.

An operator makes a job to be executed by the MFP 10a by using the PC 20. The job data created by the operator is stored in the USB memory 30. Here, the job recordable in the job data includes:

a print job for outputting a desired image data,
a scan job for creating electronic data from a desired original, or the like.

In addition, it may include a copy job for copying the desired original, and a facsimile job for transmitting the desired original or the electronic data as a facsimile data. The original means an information medium using a paper medium or the like.

Next, the jobs are described. In a print job, the image data is printed on a medium such as a sheet of paper. Print job data for executing the print job includes:
data indicating that the job is print;
data indicating a state (status) of the job;
mode data for designating a print mode; and
image data to be output.

The data indicating a state (status) of the job means the data indicating whether the job is in an unprocessed state, an interrupted state or a processed state.

The print mode includes a parameter group regarding setting of:
a paper size;
finishing;
both side printing or one side printing;
color printing or monochromatic printing;
a tint block;
an overlay; and
a watermark.

The finishing means a parameter group for designating setting of:
a stapling process of the output;
a punching process; and
a paper folding process.

In a scan job, electronic data of a original is created. The scan job data for executing the scan job includes:
data indicating that the job is scan;
data indicating a state (status) of the job; and
mode data for designating a scan mode.

The scan mode includes a parameter group which designates:
a paper size;
both side scanning or one side scanning;
color scanning or gray-scale scanning;
scan resolution; and
output file format.

In a copy job, a desired original is copied. Copy job data for executing the copy job includes:
data indicating that the job is copy;
data indicating a state (status) of the job; and
mode data for designating a copy mode.

The copy mode is a parameter group regarding setting of:
a paper size;
finishing;
both side copying or one side copying;
color copying or gray scale copying;
a tint block;
an overlay; and
a watermark.

In a facsimile job, a desired original or desired electronic data is transmitted as the facsimile data. Facsimile job data for executing the facsimile job includes:
data indicating that the job is facsimile transmission;
data indicating a state (status) of the job; and
mode data for designating facsimile transmission mode.

When a document to be transmitted has electronic data, image data of that document is further added.

A process of a job by using the USB memory 30 is described.

When job data is stored in the USB memory 30, an operator demounts the USB memory 30 from the PC 20 and mounts it on the USB port of the MFP 10a. The information reading unit (, which is an information reader,) of the MFP 10a on which the USB memory 30 is mounted checks data contents stored in the USB memory 30 and confirms the existence of the job data. When it is confirmed that the job data exists, the MFP 10a reads out the job data, and the job executing unit (, which is a job executor,) executes the job according to the contents indicated by the job data.

[Interruption of the Job Due to an Error]

Figure 3:
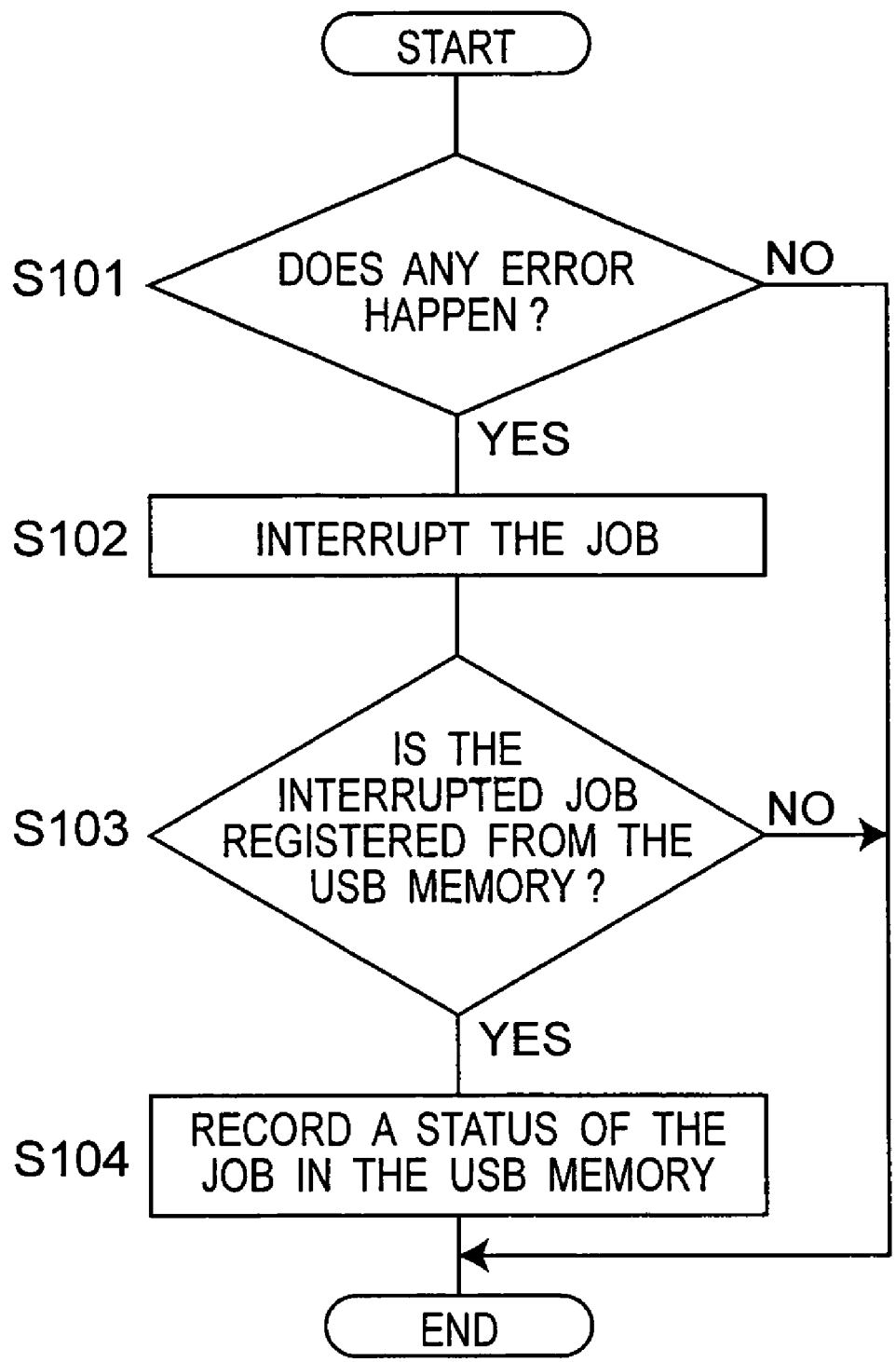
FIGS. 3, 4, 5, 6, 7, and 8 are flowcharts of processes according to the embodiment of the present invention.

FIG. 3 is a flowchart of a process on the USB memory 30 when an error occurs and the job is interrupted. This process is implemented by a program stored in the memory device of the system controller 106 of the MFP 10a and is executed by the CPU of the system controller 106 to execute the job. This error includes a case where the MFP 10a cannot continue a process instructed by the job data. The case includes: a case where a function to perform a process designated by the job data (both side printing function for example) is not provided in the MFP 10a; and a case where the MFP 10a malfunctions (because of paper empty or paper jam for example).

At step S101, it is observed whether an error occurs or not during the execution of the job. While there is no error, the job is run. When an error occurs, the running job is interrupted at step S102.

Then, it is determined at step S103 whether the running job is registered from the USB memory 30 or not. When it is determined that the job is registered from the USB memory 30, at step S104, the information recorder of the MFP 10a records (stores) data in a data region in the USB memory. This data region is a region where the state (status) of the job is to be stored. And the state (status) of the job is stored to be related with the job data. The recorded (stored) data is interruption information indicating that the job is interrupted. At this time, it is desirable that a reason for the job interruption is recorded in the USB memory 30. Meanwhile, when it is determined that the job is not registered from the USB memory 30, only an interruption process is executed at step S103. Thus, when an error occurs in the MFP 10a due to the execution of the job registered from the USB memory 30, it is recorded (stored) in the USB memory 30 that the job is in an interrupted state.

[Interruption of the Job by an Instruction of the Operator]

Figure 4:
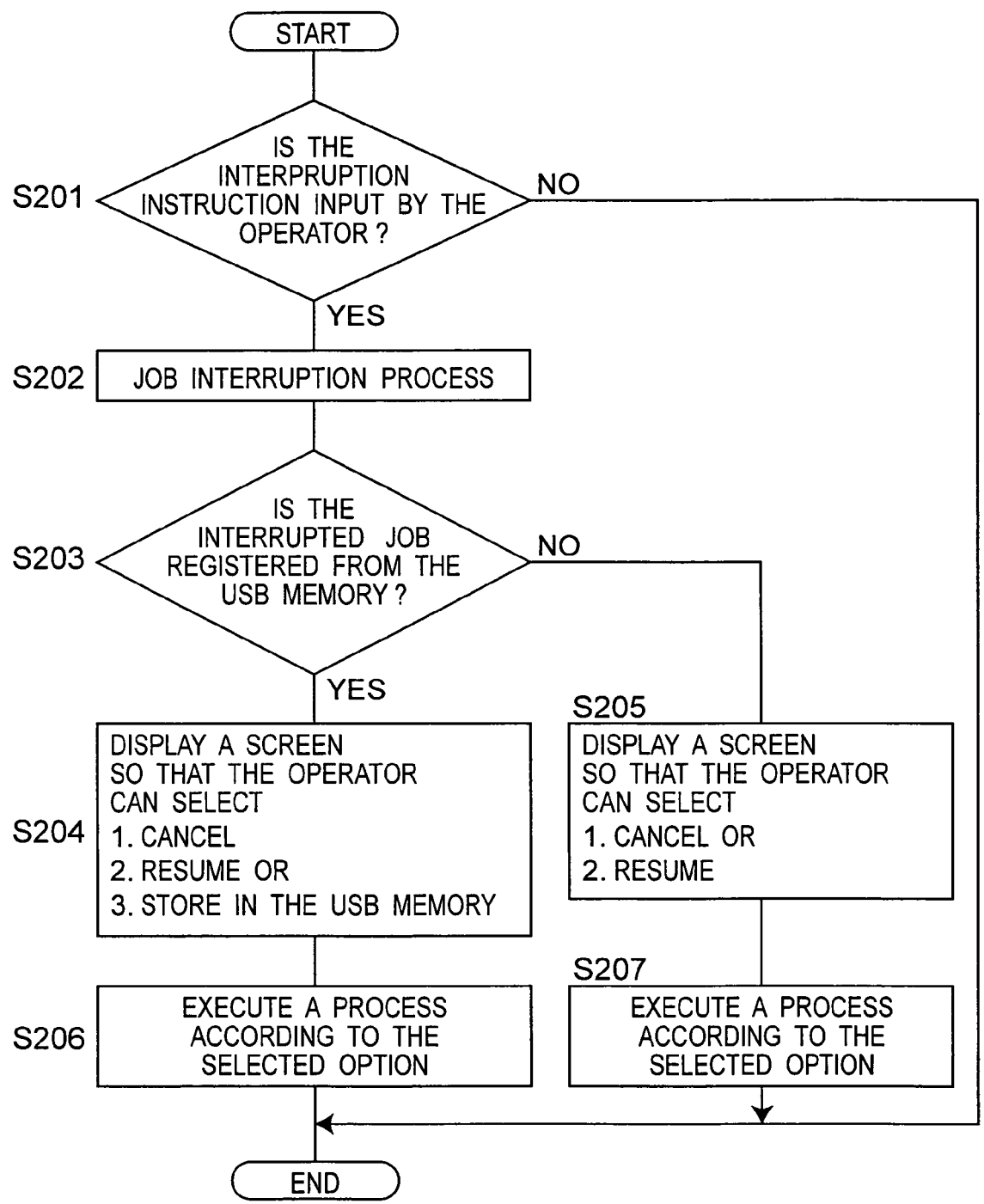

FIG. 4 is a flowchart of a process on the USB memory 30 when the operator instructs an interruption of the job with the operation panel 12 (FIG. 1) or the like. The operation panel 12 functions as a job interruption instructor and a selector. This process is implemented by a program stored in the memory device of the system controller 106 of the MFP 10a and is executed by the CPU of the system controller 106 to execute the job.

During the execution of the job, it is observed at step S201 whether there is an interruption instruction from the operator or not. This observation may be executed at the same time as the step S101 (FIG. 3) in which the error occurrence is observed. While there is no interruption instruction, the job is run. When an interruption instruction of the job is input by the operator, the running job is immediately interrupted at step S202.

Then, it is determined at step S203 whether the interrupted job is registered from the USB memory 30 or not.

When it is determined that the interrupted job is registered from the USB memory 30, a process selection image is displayed on the operation panel 12 at step S204. The process selection image includes options, such as:

1. cancel—cancellation (destruction) of the interrupted job;

2. resume—resumption of the interrupted job; and 3. store in the USB memory—storing of the interrupted state in the USB memory 30.

The operator selects and inputs one of them through the operation panel 12. The "cancellation (destruction)" of the job is selected when it is not necessary to resume the interrupted job any more. And in this case, the MFP 10a clears the contents of the job data. In addition, the data indicating that the job has been already processed may be recorded in the job data in the USB memory 30, or the job data may be deleted from the USB memory 30. The "resumption" of the job is selected when the interrupted job is to be immediately resumed. In this case, the MFP 10a immediately resumes the interrupted job. The "storing" is selected when the interruption information including information indicating that the job is in the interrupted state is to be stored in the USB memory 30. The interruption information is stored to be related with the job data and the interrupted job is deleted from the MFP 10a once. When the operator inputs one of them, the MFP 10a executes the process according to the input instruction at step S206.

Meanwhile, when it is determined that the interrupted job is not registered from the USB memory 30 (NO at step S203), a process selection image is displayed on the operation panel 12 at step S205. The process selection image includes options, such as:

(1) cancel—cancellation (destruction) of the interrupted job; and (2) resume—resumption of the interrupted job.

The operator selects and inputs one of them with the operation panel 12. When the operator inputs one of them, the MFP 10a executes the process according to the input instruction at step S207.

Thus, the MFP 10a executes the process at step S206 or at step S207 and then starts a process to execute a next registered job.

Thus, when the processes of the MFP 10a regarding the job registered from the USB memory 30 is interrupted by the instruction of the operator, the option to save (store) a fact that the job is in the interrupted state in the USB memory 30 is prepared. So even in the case of the interruption by the operator, data indicating that the job was interrupted can be recorded in the USB memory 30.

Thus, since the MFP 10a provides the process on the USB memory 30 regarding [Interruption of the job caused due to an error] (FIG. 3) and [Interruption of the job by an instruction of the operator] (FIG. 4), when the job is interrupted due to an error of the MFP 10a or due to an instruction of the operator, the fact that the job was interrupted can be recorded to be related with the job data in the USB memory 30.

[Resumption of the Interrupted and Stored Job in the USB Memory 30]

Figure 5:
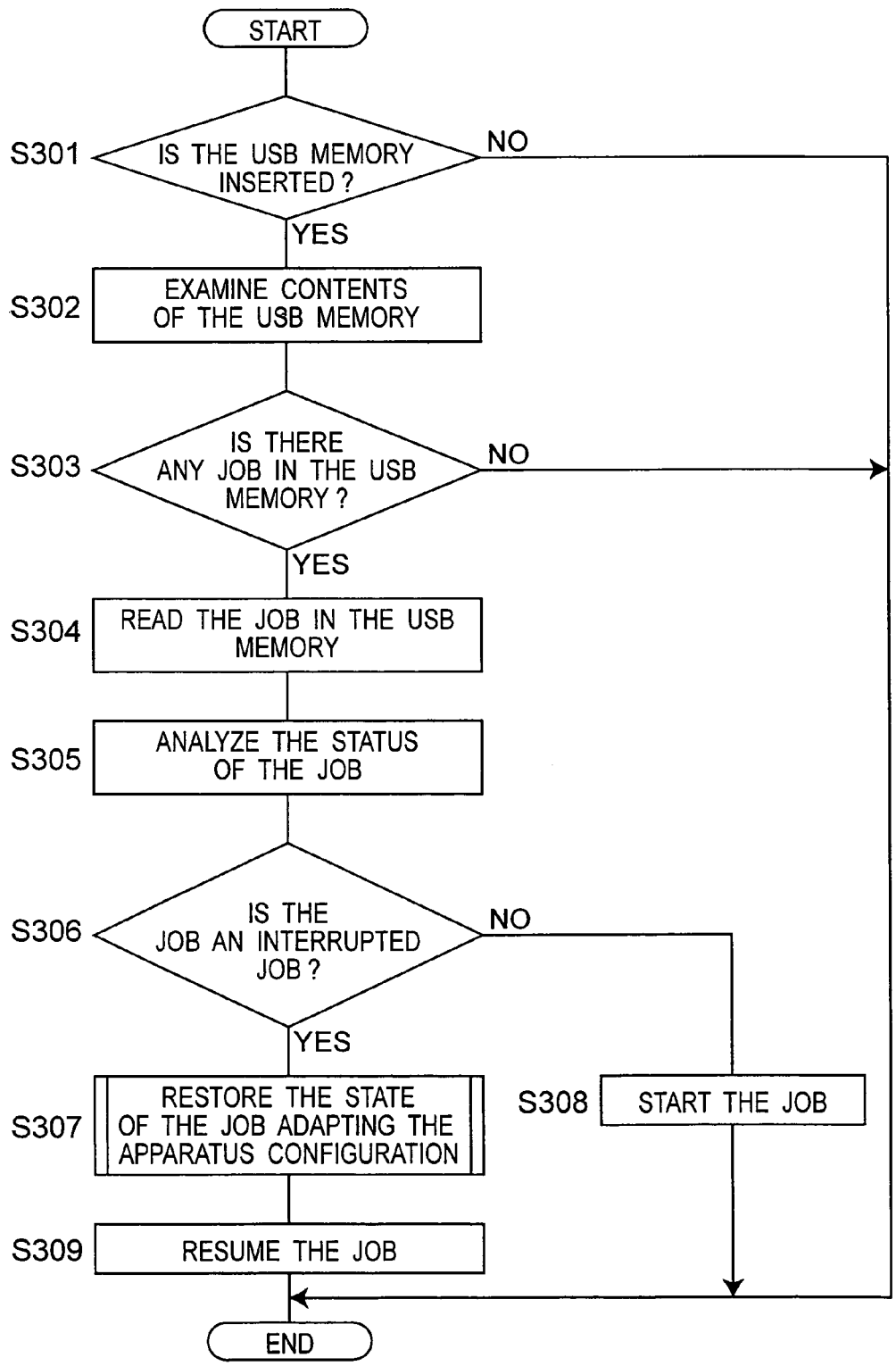

FIG. 5 is a flowchart of a process to resume the interrupted job stored in the USB memory 30. This process is implemented by a program to execute the job. This program is stored in the storage device of the system controller 106 of the MFP 10a and is executed by the CPU of the system controller 106.

It is observed at step S301 whether the USB memory 30 is mounted (inserted) or not. When there is no USB memory 30 (in a case of NO), the following processes are skipped and some other processes (not shown in FIG. 5) of the MFP 10a are executed, and then the process at step S301 is executed again.

When the USB memory 30 is mounted (in a case of YES at step S301) the MFP 10a checks the data stored in the USB memory 30 at step S302. Based on this check, it is determined at step S303 whether there is job data to be processed or not. When there is no job data to be processed (in a case of NO), the following processes are skipped and some other processes (not shown in FIG. 5) of the MFP 10a are executed, and then the process at step S301 is executed again.

When it is determined that the job data exists in the USB memory 30 (YES at step S303) the job data in the USB memory 30 is read out at step S304. Then, data on a status of the job, that is, status information is analyzed at step S305. Based on the analysis of step S305, it is determined whether the job of the read job data is the interrupted job or not, at step S306. When the job is not the interrupted job and the job is in a non-processed state the job is executed at step S308.

Meanwhile, when the job of the read job data is the interrupted job or when there is interruption information which is related with the job data (YES at step S306), the contents of the job data is further analyzed and the job is restored. At this time, the contents of the job may be changed to be adapted to the configuration and the functionality of the MFP 10a while the job is restored. In addition, the change may be permitted by the operator with the operation panel 12 at step S307.

Figure 6:
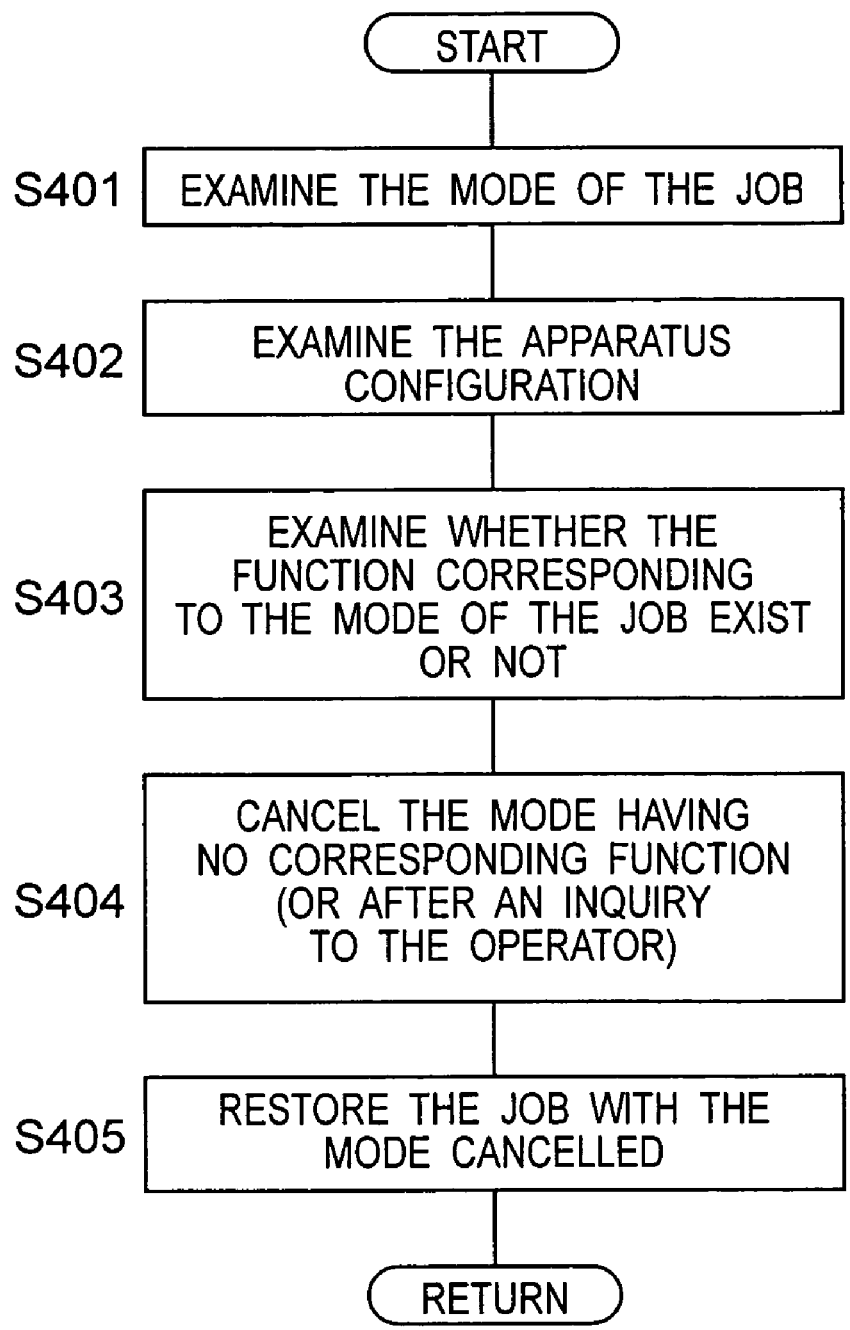

FIG. 6 is a detailed flowchart of the process at step S307. First, the kind of the job of the job data, and the mode data on the mode of the job are checked at step S401. As described above, the mode data is data on a parameter group set in executing various kinds of jobs (print, scan, copy, and facsimile data transmission). For example, when the job is print, the mode data includes the parameter group relating to setting of a paper size to be printed, finishing, both side printing or one side printing, color printing or monochromatic printing, a tint block, an overlay, and a watermark. In addition, when the job is scan, for example, the mode data includes the parameter group designating a paper size to be scanned, both side scanning or one side scanning, color scanning or gray scale scanning, scan resolution, and an output file format.

Next, the present apparatus configuration of the MFP 10a is checked at step S402. In this check, the apparatus configuration of the MFP 10a can be exactly recognized. For example, the following things can be found, that is, the paper size disposed in a sheet tray, whether both side printing can be performed or not, whether a mounted toner is only black or not, whether a color printing toner is mounted or not, or the like. In addition, a remaining amount of the mounted toner can be recognized. Based on this check, it is checked whether the MFP 10a has a function to execute the mode described in the job data or not, and its result is recorded in the memory device of the apparatus at step S403. From above check, when it is determined that the mode setting which cannot be executed is included, the setting of the mode which cannot be executed is cancelled, and the data on the mode recorded in the job data is changed to data having a mode setting which can be executed by the MFP 10a at step S404. Preferably, the operator may be informed of the fact that the setting is to be cancelled with the operation panel 12. Then it is cancelled after getting permission from the operator. When the mode setting is changed at step S404, the MFP 10a restores the job in the interrupted state under the changed mode setting at step S405. Referring to FIG. 5 again, after the job is restored in the interrupted state, the job is immediately resumed at step S309.

When the process for the USB memory 30 of the MFP 10a is thus configured, the job stored in the interrupted state can be resumed from the state. When the job is executed which is interrupted and stored due to an error occurred for the functional failure of the MFP 10a, the mode which needs the functionality not provided in the MFP 10a is invalidated, so that a similar interruption can be automatically avoided. In addition, when the USB memory 30 is mounted on a MFP other than the MFP 10a in which the job is interrupted, namely, the MFP 10b (FIG. 1), for example, the interrupted job can be easily resumed in the MFP 10b (one MFP other than the MFP 10a) from the interrupted state. At this time, when the functionality is provided in the MFP 10b which has become a cause of the error because it is not provided in the MFP 10a, the mode setting is not changed and the job can be resumed in the MFP 10b so that a desired result can be provided.

[Resuming of the Job Interrupted and Stored in the USB Memory 30 Via the Network]

In a case where at least one of the MFPs 10a and 10b and the PC 20 in the system are connected via the network 400, by mounting the USB memory 30 on the PC 20, which stores the data of the interrupted job, the MFP 10a or 10b can resume the job via the network 400.

Figure 7:
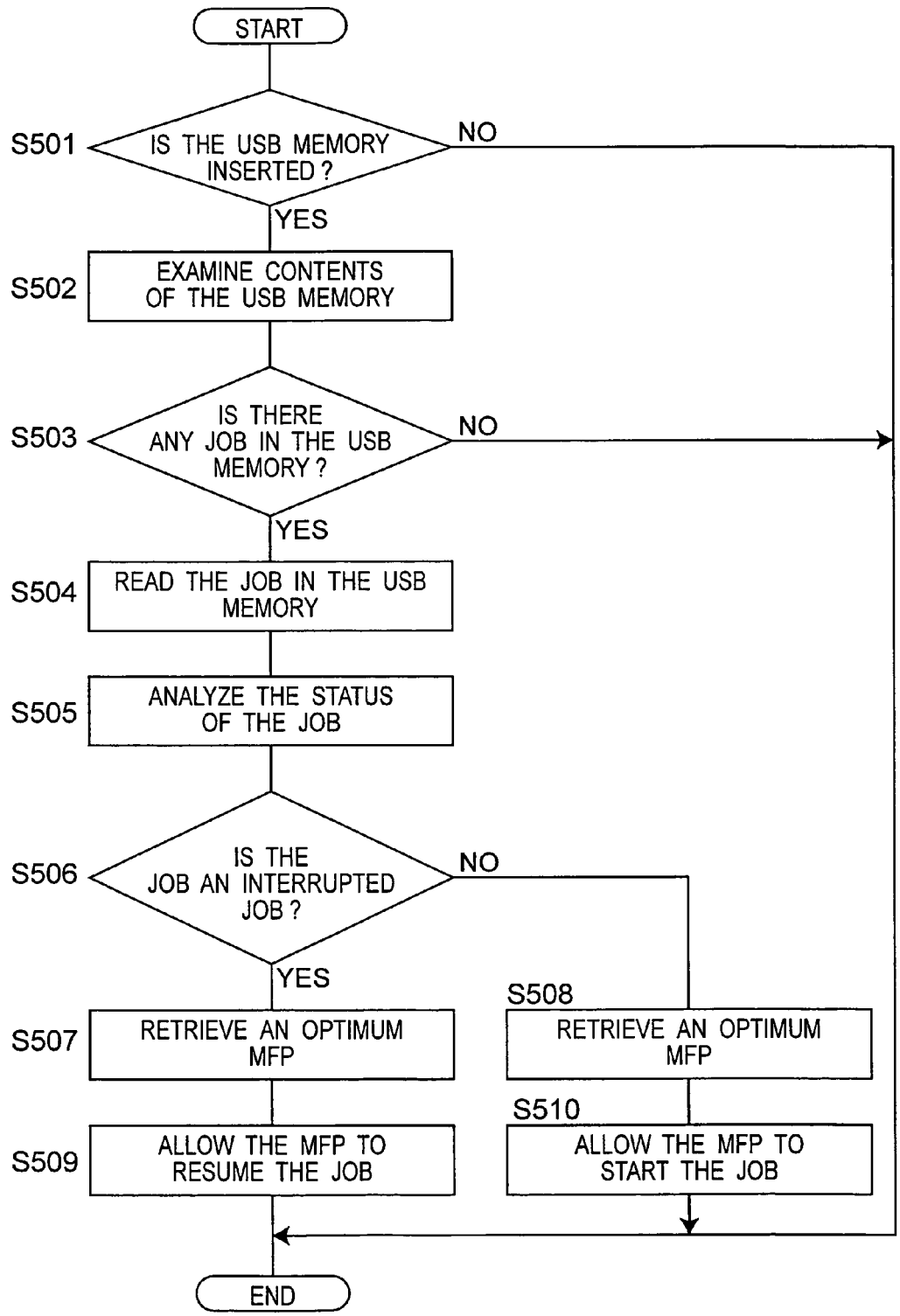

FIG. 7 is a flowchart of a process to resume an interrupted job by an MFP connected to the network 400 when the interrupted job is included in the USB memory mounted on a PC 20. This process is implemented by a program stored in the memory device of the PC 20 and executed by the CPU 202. The program runs to resume the interrupted job by the MFP connected to the network 400 when the interrupted job is included in the USB memory 30 mounted on the PC 20.

The CPU 202 observes at step S501 whether the USB memory 30 is mounted (inserted) on the USB port 21 or not. When the USB memory 30 is not mounted (No at step S501), the following processes are skipped, and after some other processes (not shown in FIG. 7) are executed, the process at step S501 is executed again.

When the USB memory 30 is mounted (YES at step S501) the PC 20 checks the contents of the USB memory 30 at step S502. Based on the result of this check, it is determined at step S503 whether the job data to be processed by the MFP exists or not. When there is no job data to be processed by the MFP (in a case of NO), the following processes are skipped, and after some other processes (not shown in FIG. 7) are executed, the process at step S501 is executed again.

When it is recognized that the job data to be processed by the MFP exists in the USB memory 30 (YES at step S503), the job data in the USB memory 30 is read out by the data reader at step S504. Then, the data on the status (state) of the job included in or related with the read job data is analyzed at step S505.

At step S506, based on the analysis at step S505, it is determined by the PC 20 whether the job of the read job data is an interrupted job or not. When the job is an interrupted job (in a case of YES), the processes at step 507 and at step 509 are executed. Meanwhile, when the job is not an interrupted job (in a case of NO), if the job has not yet been processed, the processes at steps S508 and S510 are executed.

When the job of the read job data is an interrupted job (YES at step S506), the optimum MFP for resuming the job from the interrupted state is retrieved at step S507 from one or more MFPs 10a, 10b and the like connected to the network. This retrieval of the best MFP for resuming the job means that the MFP having a function which can execute the kind of the job and the set and effective mode or the like of the read job data is retrieved in the network 400. The data on the function of the MFP required in this retrieval may be stored in the PC 20 previously. Alternatively, at this time of retrieval, the function provided in the MFP may be referred to the MFP 10a, the MFP 10b and the like via the network 400 simultaneously.

After this retrieval, the PC 20 transmits the job data to the retrieved MFP 10a via the network 400 with the data transmitter. The MFP 10a which have received the job data executes the processes at steps 307 and 309 (refer to FIG. 5).

Meanwhile, when the job in the read job data is not an interrupted job (not processed yet) (NO at step S506), the PC 20 retrieves an MFP at step S508 which can execute the present job from one or more MFPs 10a, 10b and the like connected via to the network. In addition, it may be programmed such that an MFP having an optimum function is retrieved based on the contents of the read job data at step S508.

After the retrieval, the PC 20 transmits the job data to the retrieved MFP 10a via the network 400. The MFP 10a executes this job.

Thus, according to the image processing system of the embodiment according to the present invention, the job data is stored in the USB memory 30, the MFP 10a or 10b reads the job data to execute the job. In addition, when the job is interrupted due to a functional limit or a functional failure of the apparatus (MFP 10a, for example) or by an instruction by the operator, the interrupted job can be easily resumed since the interrupted state is recorded in the USB memory 30. In addition, the interrupted job can be resumed on the apparatus (other MFP, for example) different from the MFP in which the job is interrupted.

Moreover, by mounting the USB memory 30 in which the job data is stored, on the PC, the job data of the interrupted job may be transmitted to a MFP connected to the network 400 to resume the job.

Thus, the process flows according to the embodiment are described above. Next, an example of an execution, an interruption and a resumption of a print job, and an example of an execution, an interruption and a resumption of a scan job will be described. Since these examples are illustratively described to understand more about the present invention, this description is not intended to limit the present invention.

[Example of an Execution of a Print Job]

An operator mounts a USB memory 30 on the PC 20 and registers a print job in the USB memory 30 through a predetermined operation. The print job data includes data indicating that the kind of the job is print, data on the state of the job, data on the print mode, and image data to be printed out. At this point, the job is in an unprocessed state as a matter of course.

Then, the operator dismounts the USB memory 30 from the PC 20 and mounts (insert) it on the USB port 11 of the MFP (10a, for example) to execute the job. The MFP 10a on which the USB memory 30 is mounted reads out the contents of the USB memory 30 and discovers the unprocessed print job, and starts the print job at steps S301, S306 and S308 (FIG. 5).

During the execution of the print job, when there is an error caused by a functional lack or a functional failure of the MFP 10a, or an input of a job interruption instruction by an operator at step S101 (FIG. 3) or at step S201 (FIG. 4), the interruption process of the job is performed at step S102 (FIG. 3) or at step S202 (FIG. 4), and the state of the job is recorded in the USB memory 30 at steps S103 and S104 (FIG. 3) or at steps S203 to S206 (FIG. 4). Then, the operator dismounts the USB memory 30 and keeps it until the time when the job is to be resumed.

When the operator gets a chance to resume the interrupted job, the operator mounts the USB memory 30 to the USB port 11 of the MFP (which may be the same MFP in which the job was interrupted, or may be an MFP different from the MFP in which the job was interrupted) to resume the job. When the MFP (10a, for example) recognizes the USB memory 30 mounted on the USB port 11, the MFP reads out the contents of the USB memory 30, detects the interrupted print job, restores an apparatus configuration based on the data on the mode setting described in the job data, and resume the print job at steps S301 to S306 and at steps S307 and S309 (FIG. 5).

Thus, the operator can get the remaining output of the interrupted print job. As described above, the job data stored in the USB memory 30 may be registered to the MFP 10a via the network 400.

[Example of an Execution of a Scan Job]

The operator mounts the USB memory 30 on the PC 20 and registers the scan job in the USB memory 30 through a predetermined operation. The scan job data includes data indicating that the kind of the job is scan, data on the state of the job, and data on the scan mode. At this point, the job is in an unprocessed state as a matter of course.

Then, the operator dismounts the USB memory 30 from the PC 20 and mounts (inserts) the USB memory 30 on the USB port 11 of the MFP (10a, for example) to execute the job.

The MFP 10a on which the USB memory 30 is mounted reads the contents of the USB memory 30 and detects an unprocessed scan job and starts the scan job at steps S301 to S306 and S308 (FIG. 5). At this time, the MFP 10a may display a one-touch key on the operation panel 12, which is a switch to start the scan according to a scan mode designated by the scan job in the USB memory 30, in order for the operator to instruct the scan based on the data on the scan mode. When the operator presses the one-touch key which simplifies the operation, the operator can confirm that the scan is performed according to the scan mode recorded in the scan job stored in the USB memory 30.

During the execution of the print job, when there is an error caused by a functional lack or a functional failure of the MFP 10a, or an input of job interruption instruction by a user at step S101 (FIG. 3) or at step S201 (FIG. 4), the interruption process of the job is performed at step S102 (FIG. 3) or at step S202 (FIG. 4) and the state of the job is recorded in the USB memory 30 at steps S103 and S104 (FIG. 3) or at steps S203 to S206 (FIG. 4). In the case of the scan job, image data of an original read until the interruption may be added to the job data of the interrupted job. The operator dismounts the USB memory 30 and keeps it until the interrupted job is to be resumed.

When the operator has a chance to resume the interrupted job, the operator mounts the USB memory 30 to the USB port 11 of the MFP (which may be the same MFP in which the job was interrupted, or may be a different MFP from the MFP in which the job was interrupted) to resume the job. When the MFP (10a, for example) recognizes the USB memory 30 mounted on the USB port 11, it reads out the contents of the USB memory 30, detects the interrupted scan job, restores an apparatus configuration based on the data on the mode setting described in the job data, and resumes the scan job at steps S301 to S306 and at steps S307 and S309 (FIG. 5). At this time, the job may be resumed when the operator presses the one-touch key displayed on the operation panel 12.

Thus, the operator can get a remaining output of the interrupted scan job. The scanned image data of the original may be stored in the USB memory 30. Similarly to the print job, the job data stored in the USB memory 30 may be registered to the MFP 10a through the network 400.

[Example of an Execution of Plurality of Print Jobs]

Figure 8:
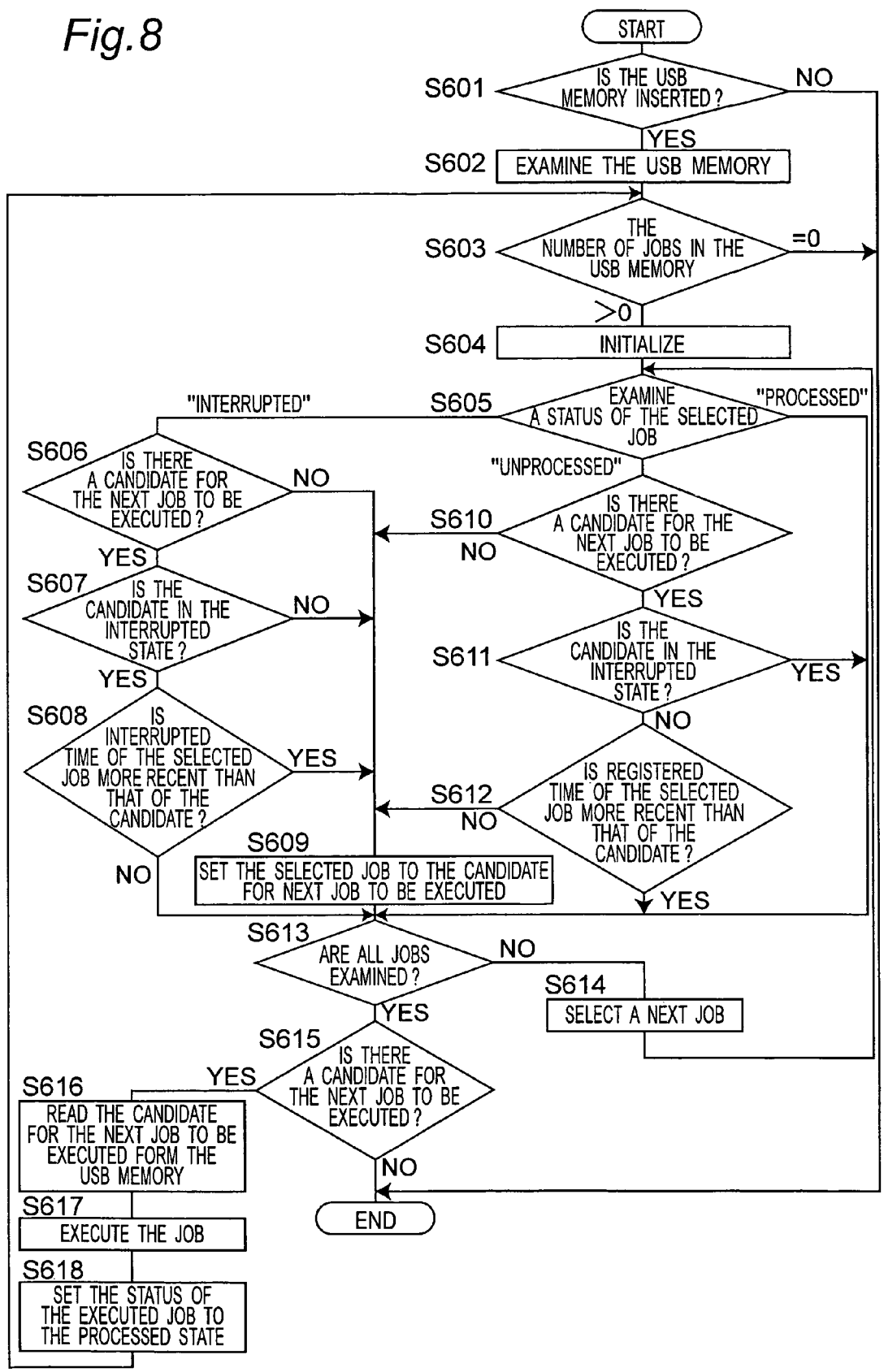

Although only one print job is registered in the USB memory 30 in the above example of the execution of the print job, in this example, a description will be made of a case where a plurality of print jobs are registered, with Reference to FIG. 8. Similarly to the above case, the data indicating that the kind of the job is print, the data on the job, the data on the print mode and the image data of the image to be printed are contained in the registered print job data, and information of a state of the job, that is, status information is stored to be related with the job data in the USB memory 30. In addition, the status information of the job includes information that the printing is not yet processed (in a case where the job has just been registered in the USB memory 30 from the PC 20, for example), that is, unprocessed-state information, information that the job was interrupted, that is, interrupted-state information, and information that the printing has been completed, that is, processed-state information. In addition, according to this example, time information when status information (any kind of state information such as unprocessed-state information, interrupted-state information, or processed-state information.) is recorded, is also stored together with the status information in the USB memory 30 to be related with the job data. This time information represents a time when the job is registered in the USB memory 30 in the case of the unprocessed-state information. Similarly, in the case of the interrupted-state information, it is a time when the interrupted-state information is recorded or a time when the job is interrupted. That is, this time information is recorded as interrupted time information.

The operator mounts (inserts) the USB memory 30, in which the plurality of print jobs are registered, onto the USB port 11 of the MFP (10a, for example) to execute the jobs. When the MFP detects that the USB memory 30 is inserted (YES at step S601), it checks the contents of the USB memory 30 at step S602. Based on this check, if the number of these jobs in the USB memory 30 is zero, the process is finished, while if there is at least one job, the process is moved to step S604.

At step S604, as an initialization, it is set such that there is no candidate for a next job to be executed, and one of the plurality of jobs is selected. The state information, that is, the status information of the selected job is checked at step S605. Namely, the status information recorded in the USB memory 30 in be relation to the selected job is read, and it is identified whether the selected job is an interrupted job, an unprocessed job, or a processed job.

When it is determined at step S605 that the state (status) of the selected job is in the interrupted state, it is confirmed at step S606 whether there exists a candidate for a next job or not. When there is no candidate for a next job, the selected job is set to be a candidate for a next job to be executed, at step S609. Meanwhile, when the candidate exists, it is determined at step S607 whether the candidate is in the interrupted state or not. Then, when it is determined that the candidate is not in the interrupted state, the selected job is set to be the candidate at step S609. According to this process, when an unprocessed job and an interrupted job both exist in the USB memory 30, the interrupted job is performed by priority. Meanwhile, when the candidate is in the interrupted state, interrupted time information, that is, time information in which the interrupted-state information of the candidate is stored, is compared with interrupted time information, that is, time information in which the interrupted-state information of the selected job is stored, and it is determined at step S608 whether the time information of the selected job is more recent (closer to the present time) or not than that of the candidate. If the interrupted time information of the selected job is more recent, the selected job is set to be the candidate at step S609, otherwise the candidate is maintained as it is. Then, it is determined at step S613 whether all jobs in the USB memory 30 have been checked or not. When it is determined that all jobs have not been checked, one of the unchecked job or jobs is selected at step S614, and then the process is returned to the step S605.

Meanwhile, when it is determined at the step S605 that the state of the selected job is not a processed state, it is confirmed at step S610 whether a candidate for a next job to be executed exists or not. When there is no candidate for a next job, the selected job is set to be the candidate at step S609. Meanwhile, when a candidate for next job to be executed exists, it is determined at step S611 whether the candidate is in the interrupted state or not. If the candidate is in the interrupted state, the process is moved to step S613. According to this process, when an unprocessed job and an interrupted job both exist in the USB memory 30, the interrupted job is performed by priority. Meanwhile, when the candidate is not in the interrupted state, the time information at which the unprocessed-state information of the candidate is stored is compared with the time information at which the unprocessed-state information of the selected job is stored since the candidate is in the unprocessed state in this example. It is determined at step S612 whether the time information of the selected job is more recent (closer to the present time) or not than that of the candidate. When the time information of the selected job is more recent, the selected job is set to be the candidate at step S609, otherwise the candidate is maintained as it is. Then, it is determined at step S613 whether all jobs in the USB memory 30 have been checked or not. When it is determined at least one job of these jobs has not been checked, the candidate is selected at step S614, and then the process is returned to the step S605.

Meanwhile, when the state of the selected job is the processed state in the determination at the step S605, the process is moved to step S613.

When it is determined at step S613 that all jobs have been checked, it is determined at step S615 whether a candidate for a next job to be executed exists or not. When there is no candidate, the operation is finished, otherwise the candidate is read from the USB memory 30 at step S616, the read job is executed at step S617, the state information stored to be related with this executed job is recorded at step S618 in the USB memory 30 such that it is in the processed state, and the process is returned to step S603.

Thus, according to this embodiment, when a plurality of print jobs are registered in the USB memory 30, the order of priority of the job among the jobs (execution order) is determined by the job execution order determiner at steps S604 to S614, and the jobs are executed based on this priority. Although a job to be executed next is determined, and then the job is executed, after this execution, a job to be executed next is determined again at steps S604 to S614 in this example, the order of priority may be determined for all jobs, and then the jobs are executed in this order, alternatively. In any case, the concept of the determination of the priority in executing a plurality of jobs is as follows.

A interrupted job is executed prior to an unprocessed job. When there are several interrupted jobs, a job which was interrupted most recently (closer to the present time, that is, an elapsed time from the interrupted time is shortest) is executed by priority.

Similarly, when there are several unprocessed jobs, the job which was registered most recently is executed by priority.

Although all of unprocessed or interrupted jobs are executed in this example, as a first variation, before step S617 is executed, an inquiry whether to execute a job or not may be made with an operator, alternatively. In this case, in order to make this inquiry, one or more of the data on the status information (state information of the job), the data on the kind of the job to be executed (in the case of the print job, the data that the job is printing), the data on the job (a job name, a file name and the like), and the data on the print mode may be displayed on the operation unit 12. And a screen with operation keys for urging the operator to input whether to execute the job or not may also be displayed on the operation unit 12 so that the operator can select no job or one or more jobs to be executed. Moreover, at this time, the information indicating "not to be processed" may be recorded to be related with the unselected job as state information of the job (status information), which is not executed as a consequence of the above inquiry, and this job is to be handled similarly to an unprocessed-state job shown in FIG. 8. So the "not to be processed" state information may be rewritten to be the unprocessed-state information, after "NO" at step S615.

Furthermore, as a second variation, it is determined whether a job is to be executed or not depending on whether a predetermined time has elapsed from the time information to the present time or not, that is, whether a time interval between the time information and the present time is longer than the predetermined time interval or not. In other words, the second variation may be configured such that the job is not executed if the predetermined time has passed from the time when the state information is recorded to the present time, that is, if the time interval between the time information and the present time is longer than the predetermined time interval, while the job is executed if the predetermined time interval has not elapsed between the time information and the present time yet. More specifically, according to the second variation, the interrupted job not executed even after the predetermined time interval has passed is not executed since it is highly likely that it is not necessary for the operator. Similarly, the unprocessed job which has not been executed for the predetermined time or more after its registration is not executed since it is highly likely not urgently executed and only stored.

Either the above first or second variation may solely be applied to this embodiment, or both can be applied to this embodiment together. That is, only when the predetermined time interval from the time information to the present time has elapsed, it is confirmed whether the job is to be executed or not, and if the predetermined time interval has not yet elapsed from the time information the job is executed without confirmation.

According to the present invention, when a job is interrupted by a functional limit or a functional failure of an apparatus, or by a operator's instruction, information on the status of the job (interrupted state) is recorded in the portable storage medium. Hence, resuming and finishing of the interrupted job can be more flexible and so that the image processing becomes more user-friendly.

As a matter of course, the PC 20 in the system according to this embodiment of the present invention can carry out an application program for job management, which can store, read and update a job data in the USB memory 30.

In addition, the portable storage medium includes a detachable storage medium which can be read by a computer, such as a USB memory, a flexible disk, a compact disc (CD (including a CD-R, a CD-RW and CD-ROM)), and a card type memory device.

In addition, the portable storage medium interface includes an USB port, a flexible disk drive, a CD drive, and a slot for a card type memory device.

In addition, the information processing apparatus includes an electronic computer which has an USB port such as a work station other than the personal computer.

Furthermore, the image processing apparatus includes a printer, a duplicating machine, a copying machine, and a facsimile machine having an USB port other than the MFP.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
    an information reader which reads job data from a portable storage medium in which the job data is stored;
    a job executor which executes a job based on the job data read by said information reader;
    an information recorder which records in the portable storage medium interruption information that the job is interrupted, the interruption information being related with the job data stored in the portable storage medium, in response to an interruption of the job;
    a display device which displays a plurality of options to be selected for the interrupted job; and
    a selector which allows an operator to select at least one from the plurality of options,
    wherein in response to the operator selecting to store the interrupted job data, said information recorder records the interruption information in the portable storage medium in relation to the job data, and
    the image processing apparatus further comprising a receiver which receives job data from other than the portable storage medium,
    wherein at least either the number or contents of the options to be displayed by said display device is changed according to whether an interrupted job is read from the portable storage medium or received by said receiver.

2. The image processing apparatus according to claim 1, further comprising a job interruption instructor for the operator to instruct the interruption of the job, wherein
    said information recorder records the interruption information containing data that the job is interrupted by an instruction by the operator.

3. An image processing apparatus comprising:
    an information reader which reads job data from a portable storage medium in which the job data is stored;
    a job executor which executes a job based on the job data read by said information reader; and
    an information recorder which records in the portable storage medium interruption information that the job is interrupted, the interruption information being related with the job data stored in the portable storage medium, in response to an interruption of the job,
    wherein said information reader reads the job data related with the interruption information from the portable storage medium and said job executor executes the job based on the job data related with the interruption information, and
    wherein in response to said information reader reading the job data related with the interruption information, said job executor changes the read job data into job data having a mode which can be executed and then executes the job based on the changed job data.

4. The image processing apparatus according to claim 3, further comprising a job interruption instructor for an operator to instruct the interruption of the job, wherein
    said information recorder records the interruption information containing data that the job is interrupted by an instruction by the operator.

5. An image processing system comprising
    an image processing apparatus and an information processing apparatus,
    said image processing apparatus including:
    an information reader which reads job data from a portable storage medium in which the job data is stored;
    a job executor which executes a job based on the job data read by said information reader;
    an information recorder which records in the portable storage medium interruption information that the job is interrupted, the interruption information being related with the job data stored in the portable storage medium, in response to an interruption of the job;
    a display device which displays a plurality of options to be selected for the interrupted job; and
    a selector which allows an operator to select at least one from the plurality of options,
    wherein in response to the operator selecting to store the interrupted job data, said information recorder records the interruption information in the portable storage medium in relation to the job data, and
    the image processing apparatus further comprising a receiver which receives job data from other than the portable storage medium,
    wherein at least either the number or contents of the options to be displayed by said display device is changed according to whether an interrupted job is read from the portable storage medium or received by said receiver, and
    said information processing apparatus connected to said image processing apparatus and including:
    a data reader which reads job data related with interruption information from a portable storage medium in which the job data and the interruption information read by the data reader are stored; and
    a data transmitter which transmits the job data related with the interruption information read by the data reader to an image processing apparatus connected to said information processing apparatus.

6. An image processing system comprising
    an image processing apparatus and an information processing apparatus,
    wherein said image processing apparatus including:
    an information reader which reads job data from a portable storage medium in which the job data is stored;
    a job executor which executes a job based on the job data read by said information reader; and
    an information recorder which records in the portable storage medium interruption information that the job is interrupted, the interruption information being related with the job data stored in the portable storage medium, in response to an interruption of the job,
    wherein said information reader reads the job data related with the interruption information from the portable storage medium and said job executor executes the job based on the job data related with the interruption information, and wherein in response to said information reader reading the job data related with the interruption information, said job executor changes the read job data into job data having a mode which can be executed and then executes the job based on the changed job data, and said information processing apparatus connected to said image processing apparatus and including:

a data reader which reads job data related with interruption information from a portable storage medium in which the job data and the interruption information read by the data reader are stored; and a data transmitter which transmits the job data related with the interruption information read by the data reader to an image processing apparatus connected to said information processing apparatus.

7. A method for image processing comprising:

reading, by an information reader of an image processing apparatus, job data from a portable storage medium in which the job data is stored;

executing, by a job executor of the image processing apparatus, a job based on the job data read by said information reader;

in response to an interruption of the job, recording, by an information recorder of the image processing apparatus, in the portable storage medium interruption information that the job is interrupted, the interruption information being related with the job data stored in the portable storage medium;

displaying, by a display device of the image processing apparatus, a plurality of options to be selected for the interrupted job;

allowing, by a selector an operator of the image processing apparatus, to select at least one from the plurality of options;

in response to the operator selecting to store the interrupted job data, recording by said information recorder the interruption information in the portable storage medium in relation to the job data;

receiving, by a receiver of the image processing apparatus, job data from other than the portable storage medium; and changing at least either the number or contents of the options to be displayed by said display device according to whether an interrupted job is read from the portable storage medium or received by said receiver.

8. A computer readable medium having stored thereon computer executable instructions which when executed by a computer of an image processing apparatus cause the computer to perform:

reading, by an information reader of the image processing apparatus, job data from a portable storage medium in which the job data is stored;

executing, by a job executor of the image processing apparatus, a job based on the job data read by said information reader;

in response to an interruption of the job, recording, by an information recorder of the image processing apparatus, in the portable storage medium interruption information that the job is interrupted, the interruption information being related with the job data stored in the portable storage medium;

displaying, by a display device of the image processing apparatus, a plurality of options to be selected for the interrupted job;

allowing, by a selector an operator of the image processing apparatus, to select at least one from the plurality of options;

in response to the operator selecting to store the interrupted job data, recording by said information recorder the interruption information in the portable storage medium in relation to the job data;

receiving, by a receiver of the image processing apparatus, job data from other than the portable storage medium; and changing at least either the number or contents of the options to be displayed by said display device according to whether an interrupted job is read from the portable storage medium or received by said receiver.

9. A method for image processing comprising:

reading, by an information reader of an image processing apparatus, job data from a portable storage medium in which the job data is stored;

executing, by a job executor of the image processing apparatus, a job based on the job data read by said information reader;

in response to an interruption of the job, recording, by an information recorder of the image processing apparatus, in the portable storage medium interruption information that the job is interrupted, the interruption information being related with the job data stored in the portable storage medium;

reading by said information reader the job data related with the interruption information from the portable storage medium;

executing by said job executor the job based on the job data related with the interruption information; and in response to said information reader reading the job data related with the interruption information, changing by said job executor the read job data into job data having a mode which can be executed and then executing by said job executor the job based on the changed job data.

10. A computer readable medium having stored thereon computer executable instructions which when executed by a computer of an image processing apparatus cause the computer to perform:

reading, by an information reader of the image processing apparatus, job data from a portable storage medium in which the job data is stored;

executing, by a job executor of the image processing apparatus, a job based on the job data read by said information reader;

in response to an interruption of the job, recording, by an information recorder of the image processing apparatus, in the portable storage medium interruption information that the job is interrupted, the interruption information being related with the job data stored in the portable storage medium;

reading by said information reader the job data related with the interruption information from the portable storage medium;

executing by said job executor the job based on the job data related with the interruption information; and in response to said information reader reading the job data related with the interruption information, changing by said job executor the read job data into job data having a mode which can be executed and then executing by said job executor the job based on the changed job data.

* * * * *